United States Patent
Sakakura

(10) Patent No.: US 6,981,061 B1
(45) Date of Patent: Dec. 27, 2005

(54) METHOD AND SYSTEM FOR UPDATING A DATA SYSTEM IN CONJUNCTION WITH SYNCHRONIZED CLOCK MODULES

(75) Inventor: Takashi Sakakura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/284,736

(22) PCT Filed: Jun. 10, 1998

(86) PCT No.: PCT/JP98/02550

§ 371 (c)(1),
(2), (4) Date: Apr. 19, 1999

(87) PCT Pub. No.: WO99/26165

PCT Pub. Date: May 27, 1999

(30) Foreign Application Priority Data

Nov. 14, 1997 (JP) .............................................. 9-313073

(51) Int. Cl.[7] .............................................. G06F 15/16
(52) U.S. Cl. ....................... 709/248; 709/210; 709/248; 707/8; 707/10; 707/201; 713/502
(58) Field of Search .............................. 707/8, 10, 201; 709/102, 106, 201, 210, 246, 248; 713/500, 502; 705/21, 37

(56) References Cited

U.S. PATENT DOCUMENTS

| | | | | |
|---|---|---|---|---|
| 3,648,256 | A | * | 3/1972 | Paine et al. |
| 4,007,450 | A | * | 2/1977 | Haibt et al. |
| 4,285,037 | A | * | 8/1981 | Von Stetten |
| 4,432,057 | A | * | 2/1984 | Daniell et al. |
| 5,327,556 | A | * | 7/1994 | Mohan et al. |
| 5,410,697 | A | * | 4/1995 | Baird et al. |
| 5,491,815 | A | * | 2/1996 | Basso et al. |

(Continued)

FOREIGN PATENT DOCUMENTS

| | | |
|---|---|---|
| EP | 038162 A2 | 9/1990 |
| JP | H3-158037 | 7/1991 |
| JP | A3-505938 | 12/1991 |
| JP | H8-009053 | 1/1996 |
| JP | H9-147035 | 6/1997 |
| JP | H9-282376 | 10/1997 |
| JP | 62209635 | 9/1998 |

OTHER PUBLICATIONS

Mamoru Maekaw, Kyorits–Shuppan–Kabushik–Kaish, Dec. 25, 1991, pp. 169–176.

Mamoru Maekawa, et al. "Distributed Operating System—shat comes after UINIX"; pp. 169–176, published Dec. 25, 1991, Kyoritsu Shuppan Kabushiki Kaisha.

Disuke Ochiai, "*The stock exchange of London moved to new trade system*," Fall 1997, (Japanese text only).

*Primary Examiner*—Le Hien Luu
*Assistant Examiner*—Stephen Willett
(74) *Attorney, Agent, or Firm*—Birch, Stewart, Kolasch & Birch, LLP

(57) ABSTRACT

In a system where a plurality of mobile terminals shares a data of the server, upon issuing an update request data of server from the mobile terminals, without depending on the stability of the communication method used by the mobile terminals, a fair data updating becomes possible which only relies on an issuing order of the update request. In the present system, the clock module is provided to all the mobile terminals and the server having a synchronized time. The mobile terminal adds the update request issuing time obtained from the timing module to the update request data upon issuing the update request data, and the update request data is repeatedly sent until the server receives it. During the repeated transmission, an issuing time attached to the update request is identical to the original issuing time, and the server processes the data update request received within the update request reception period in an order of the issuing time.

22 Claims, 15 Drawing Sheets

U.S. PATENT DOCUMENTS

| | | | | |
|---|---|---|---|---|
| 5,579,318 | A | * | 11/1996 | Reuss et al. |
| 5,796,999 | A | * | 8/1998 | Azagury et al. |
| 5,802,322 | A | * | 9/1998 | Niblett |
| 6,055,545 | A | * | 4/2000 | Yazaki et al. |
| 6,119,104 | A | * | 9/2000 | Brumbelow et al. |
| 6,182,197 | B1 | * | 1/2001 | Dias et al. |
| 6,209,106 | B1 | * | 3/2001 | Kublan et al. .............. 713/500 |
| 6,304,924 | B1 | * | 10/2001 | Varma |
| 6,389,423 | B1 | * | 5/2002 | Sakakura |
| 2001/0034770 | A1 | * | 10/2001 | O'Brien |

* cited by examiner

Fig. 6(a)

```
PRODUCT ID: ORG2-M
QUANTITY: 200 JUST
BUYING PRICE: <350
       SEND
```

Fig. 6(b)

```
PRODUCT ID: ORG2-M
QUANTITY: 100
SELLING PRICE: >300
       SEND
```

Fig. 8

| | |
|---|---|
| USER ID:970201A;<br>TARO SUZUKI | 801 |
| TRANSMISSION TIME:<br>9709171103 3212 | 802 |
| TABLE ID:FRT | 803 |
| RECORD ID:ORG2−M | 804 |
| OPERATION:SUBTRACT | 805 |
| QUANTITY:200 JUST | 806 |
| CONDITION:<350 | 807 |
| PAYMENT BANK:<br>BANK OF ○○<br>SHIBUYA BRANCH66282 | 808 |

800

METHOD AND SYSTEM FOR UPDATING A DATA SYSTEM IN CONJUNCTION WITH SYNCHRONIZED CLOCK MODULES

This application is the national phase under 35 U.S.C. §371 of PCT International Application No. PCT/JP98/02550 which has an International filing date of Jun. 10, 1998 which designated the United States of America.

TECHNICAL FIELD

The present invention relates to data updating system and data updating method for computer systems. Particularly, the invention relates to the data updating system and the data updating method of a shared data among a plurality of user terminals connected to various types of communication environment.

BACKGROUND ART

Problem with maintaining a consistency of the shared data is occurring at various levels in a conventional computer system. The problem of maintaining a data consistency occurs when more than two executing units are sharing the data, because each executing unit updates the data being shared. Also, when each executing unit has a copy of the shared data, a problem of how to maintain consistency between an original shared data and the copy of the shared data occurs, and between the copies of the shared data. To give an example of how the problem of maintaining the data consistency is being dealt within a multi-processor computer of a shared memory type, if each CPU (Central Processing Unit) updates data of the shared memory, a loss of data consistency is prevented by performing an exclusive control based on the data of the shared memory by using a test-and-set instruction, and by writing the data synchronously. Also, when each CPU has a cache memory, a consistency of cache data between CPUs is maintained by applying solution measures such as write through, copy back and snooping.

Another example is a case of sharing a file among processes. This is a case where maintaining a file consistency is not as strict, although access from a plurality of processes are permitted. Or, in a case when the data consistency is very important, the exclusive control among processes is provided by using a semaphore lock mechanism, although this may sacrifice the processing efficiency. Other than the given examples, there are lots of technique relating to the data consistency. To give one concrete example, refer to Japanese Unexamined Patent Publication SHO 62-206935 which discloses a technique to serialize a control file access for the exclusive control of a system resource using updating queue and processing task.

A database transaction has one of the major data consistency problem occurring at an application program level, for which the present invention is mainly being applied. The transaction includes a discrete electronic business dealings such as bank account and inventory control. Such transaction must satisfy a property known as ACID (Atomicity, Consistency, Isolation and Durability). In other words, every one of transactions taking place in a system must be a transaction that "cannot be separated", "does not lose data consistency", "is isolated from other transactions" and "should never lose data".

In order to implement this property, the conventional system has synchronously processed a transaction. That is, when updating data in a database from a terminal, a series of operation will take place as follows: connects to the database; obtains permission to update the database; refers to a data and updates the data; issues a database updating instruction (commit); and completes the series of operation. For example, when a database user wish to update a data which is being used by another database user, the updating transaction waits for the database to become available in a state of being connected to the database. The series of operation maintains connections to the database and executed without interrupt.

If, the database is disconnected during the series of operation, the executing transaction is interrupted and the transaction becomes invalid. The conventional database system has guaranteed for the data consistency, assuming that the series of transaction operation, such as specifying an update data, the exclusive control of update data, a data manipulation, and a database updating that will not separate and interrupt, are all guaranteed.

A technique to expand a futures trading market which has been practiced based on "standing at a dealing session" using a computer system, instead of using a physical place called "dealing session", is disclosed in Japanese Unexamined Patent Publication HEI 3-505938. Information obtained from attending the "dealing session" is supplied by the computer system. And a trading mechanism in the "dealing session", or in other words, a transaction mechanism is implemented by the computer system.

The computer system adopted in the present invention, for example, is described in Japanese unexamined patent publication HEI 3-505938. By applying the present invention to this computer system, the "dealing session" which this computer system is aiming for can further be expanded. According to the conventional transaction processing, provided that an update request of the data from a terminal is processed synchronously, including a case of using a queuing mechanism such as TP (transaction processing) monitor which aims to adjust a database access load, the conventional transaction processing is implemented by setting the exclusive control mechanism for each transaction processing. To perform a synchronous processing from the terminal, a connection status between the terminal and a host (or server) needs be guaranteed by a communication protocol of some kind. A quality of communication channel is guaranteed by the communication protocol to an extent, however, when using a wireless channel such as mobile telephone and PHS (personal handyphone system), the connection status of the channel cannot necessarily be guaranteed, including a case of channel cut-off as well as a case when a user does not explicitly use the wireless channel. In addition, a rate of transferring is slow. It is predicted that a lot of invalid transactions occurs when the transaction processing is attempted from a terminal which uses such wireless channel. When the transaction is invalid, the user incurs loss and a load on the system is increased.

The present invention aims to supply the data updating system and the data updating method that can execute a data updating transaction among the users equally, even when an user may be using a terminal which cannot necessarily guarantee the connection status.

SUMMARY OF THE INVENTION

According to one aspect of the present invention, a data updating system comprises a plurality of user terminals and a server for controlling a shared data among users. The plurality of user terminals and the server include clock modules for keeping a time synchronized between the user terminal and the server. The user terminal includes an update request transmission processing unit for transmitting a shared data update request to the server by attaching a time obtained from the clock module as a data update issuing time when representing a shared data updating, and for repeatedly transmitting the shared data update request in keeping the data update issuance time unchanged until the shared data update request is received by the server. The server includes a shared data control module for deciding an updating order of the shared data update request based on an attached data update issuing time of the shared data update request received from the user terminal.

According to another aspect of the present invention, the data updating system comprises the shared data control module which includes an update rule control unit for setting an update request reception period, and an update request control unit for receiving the shared data update request received within the update request reception period.

According to another aspect of the present invention, the data updating system comprises the update rule control unit which further sets a valid update request issuance period which is included in the update request reception period. The update request control unit receives a shared data update request for which a data update request issuance period of the shared data update request received is within the valid update request issuance period.

According to another aspect of the present invention, the data updating system comprises the update data request transmission processing unit which transmits the shared data update request including a data updating condition to the server. The shared data control module includes a data updating unit for checking the data updating condition included in the shared data update request in an order of data update request issuance time after the update request reception period expires, deciding a shared data update value based on the shared data update request when the update condition is met, and updating the shared data to the shared data updating value.

According to another aspect of the present invention, the data updating system comprises the data updating unit which checks the data updating condition included in the shared data update request which is already received within the valid update request issuance period in an order of the update request issuing time, and decides a shared data update predicting value based on the shared data update request when the update condition is met.

According to another aspect of the present invention, the data updating system comprises the shared data control module which includes a user notification unit for giving one of permissions to the user terminal from permissions classified by strengths, and for selecting information which is transmitted to the user terminal based on the permission.

According to another aspect of the present invention, the data updating system comprises the user notification unit which transmits an update log of the shared data only to a user terminal having a permission of a certain strength.

According to another aspect of the present invention, the data updating system comprises the user notification unit which transmits a content of the data updating request received from the user terminals only to a user terminal having a permission of a certain strength.

According to another aspect of the present invention, the data updating system comprises the shared data control module which includes a user notification unit for notifying the shared data to the user terminal when the shared data is updated.

According to another aspect of the present invention, the data updating system comprises the user notification unit which includes at least a differential data between the shared data before updating and after updating in a content of the notification.

According to another aspect of the present invention, the data updating system comprises the user notification unit which notifies to a user terminal that has accessed the shared data before updating the shared data.

According to another aspect of the present invention, the data updating system comprises the user notification unit which notifies to a user terminal that has accessed the shared data within a pre-determined period before updating the shared data.

According to another aspect of the present invention, the data updating system comprises the user terminal which transmits an information transmission request to the server. The shared data control module includes a user notification unit for receiving the information transmission request from the user terminal, for checking an access log, and for responding to the information transmission request if the user terminal has accessed the shared data before receiving the information transmission request.

According to another aspect of the present invention, the data updating system comprises the user notification unit which responds to the information transmission request if the user terminal has accessed the shared data within the pre-determined period before receiving the information transmission request.

According to another aspect of the present invention, the data updating system comprises the information transmission request from the user terminal which is a transmission request of the content of the data updating request already arrived to the server before a shared data updating process.

According to another aspect of the present invention, the data updating system comprises the user terminal which transmits a condition for monitoring the shared data updating. The shared data control module includes a user notification unit for registering a transmitted condition, and for notifying the shared data updating to the user terminal when the condition is met at the shared data updating.

According to another aspect of the present invention, the data updating system comprises the user terminal which transmits a condition for monitoring the shared data updating. The shared data control module includes a user notification unit for registering the transmitted condition, and for notifying to the user terminal that the shared data updating predicting value meets the condition when the shared data updating predicting value meets the condition.

According to another aspect of the present invention, the data updating system comprises the clock module which includes an encryption unit.

According to another aspect of the present invention, the data updating system comprises the clock module which includes a user terminal authentication function.

According to another aspect of the present invention, the data updating system comprises the server which includes a memory unit for storing a shared data updating request queue, and for arranging the shared data update request received from the user terminal by the shared data control module in an order of the data update request issuance time.

According to another aspect of the present invention, a data updating method for a computer systems having a plurality of user terminals, and a server for controlling the shared data among the users, wherein the plurality of user terminals and the server respectively have clock modules for keeping a time, the data updating method comprising the steps of:

synchronizing a time between the clock modules of a plurality of user terminals and the clock module of the server;

by the user terminal, attaching a time obtained from the clock module as a data update request issuance time to a shared data update request when requesting a shared data update, and transmitting the shared data update request to the server, and repeatedly transmitting the shared data update request in keeping the data update request issuance time unchanged until the shared data update request is received at the server; and by the server, receiving the shared data update request from the user terminal and deciding the updating order of the shared data based on an attached data update request issuance time attached to the shared data update request received.

According to another aspect of the present invention, the data updating method, wherein the shared data update request which is one of a selling order and a buying order which includes a first condition and a quantity, wherein the shared data update request is stored in a memory unit of the server in a format of shared data update request queue in an order of the data update request issuance time, wherein the data updating method comprises the steps of:
a) checking by executing one of the steps of (a1) to (a3), depending on a state of the shared data updating request queue stored in the memory unit of the server;
   a1) completing the data updating process when neither the selling order nor the buying order is stored in the shared data update request queue stored in the memory unit of the server;
   a2) taking the buying order as a main order and taking the selling order as a dealing order when a top of the shared data update request queue stored in the memory unit of the server is the buying order, and advancing to a first condition comparing step (b); and
   a3) taking the selling order as a main order and the buying order as a dealing order when a top of the shared data updating request queue stored in the memory unit of the server is the selling order, and advancing to the first condition comparing step (b); and
b) comparing the first condition by reading the dealing order in an order from the shared data updating request queue stored in the memory unit of the server, and executing one of the steps depending on an availability of a dealing order that matches in the first condition with the main order;
   b1) if there is no matching in first condition, deleting the main order from the shared data update request queue as a non-established main order and returning to the checking step (a);
   b2) if the first condition matches, comparing the buying quantity and the selling quantity, and executing one of the following steps based on a result of comparing;
      b21) if the buying quantity is exceeding the selling quantity, non-establishing the buying order and the selling order, and reading a next dealing order from the shared data update request queue, and returning to the first condition comparing step;
      b22) if the buying quantity is same with the selling quantity, establishing the buying order and the selling order, deleting the buying order and the selling order from the shared data update request queue, and returning to the checking step (a); and
      b23) if the selling quantity exceeds the buying quantity, establishing the selling order and the buying order, deleting the buying order from the shared data update request queue, and replacing selling quantity to an exceeding buying quantity, updating and storing the queue data of the selling order, and returning to the checking step (a).

BRIEF DESCRIPTION OF THE DRAWINGS

FIG. 6 illustrates an example of input screen of a terminal application using the present invention;

FIG. 8 illustrates an example of the shared data update request data of the present invention;

DETAILED DESCRIPTION OF THE INVENTION

Embodiment 1

The data updating system of the present invention will be described with reference to the drawings of FIGS. 1 to 13. The present invention describes a commodities exchange system as an adopted example, however, this example is one type of transaction system participated by a plurality of users. The commodities exchange system provides a virtual market, and participation to the market is only possible from terminals provided by the system. The participants are not only restricted to a wired terminal, but they can also be a wireless terminal, so that all the users can participate in the market equally.

Figure 1:
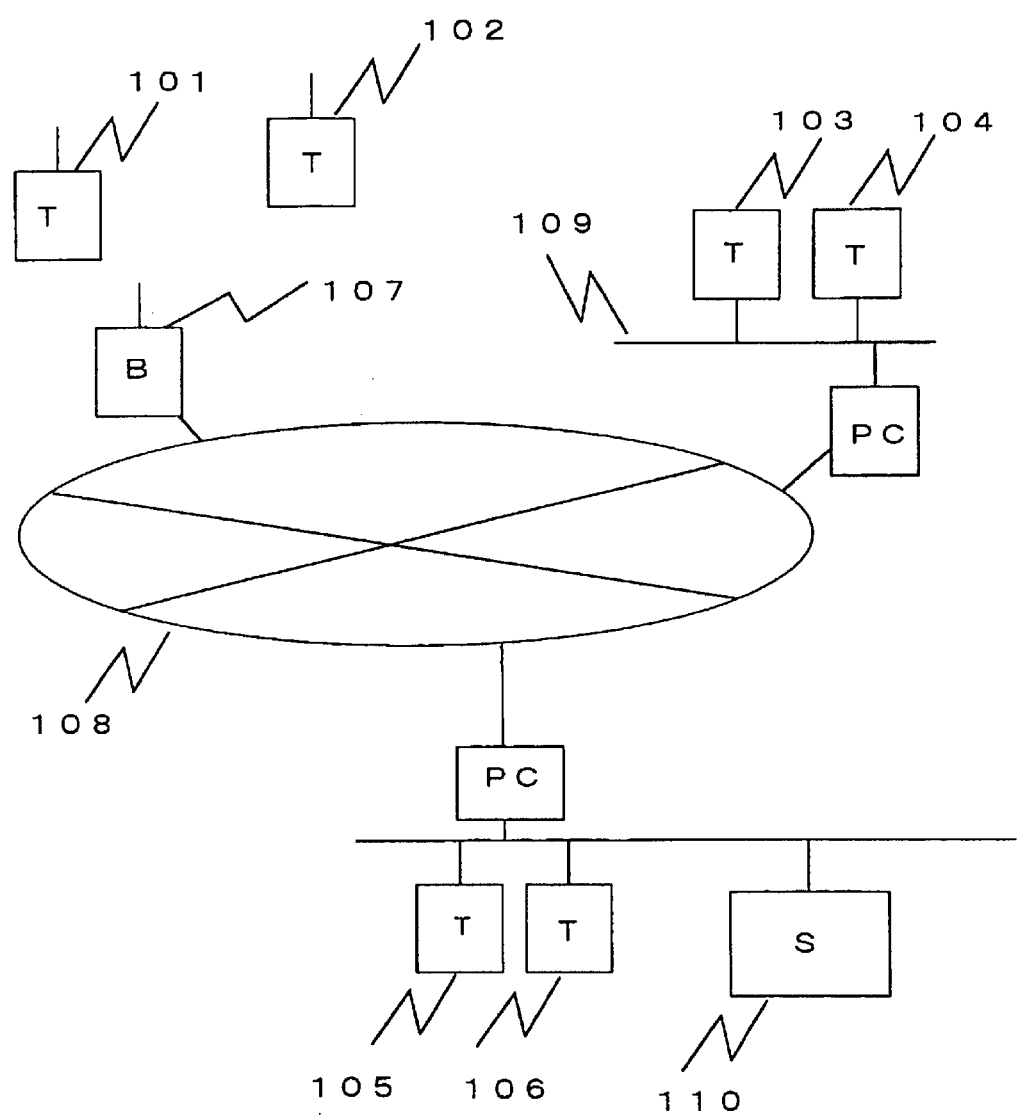
FIG. 1 illustrates a configuration of the system adopted in the present invention.

FIG. 1 illustrates three different cases of participation by the users. These includes a case of participating from wireless terminals 101 and 102 to a base station 107 using a mobile telephone channel-, via a public network 108.

There is a case of participating from terminals 103 and 104 that are connected to an intranet which is connected via a public line 109 and a personal computer PC. There is also a case of participating from terminals 105 or 106 that are connected to a same LAN (Local Area Network) connected to a server 110 which controls a shared data.

The configuration of the data updating system will be described next, however, from hereinafter the wireless terminals 101 and 102 and the terminals 103 to 106 will simply be referred to as a user terminal.

Figure 2:
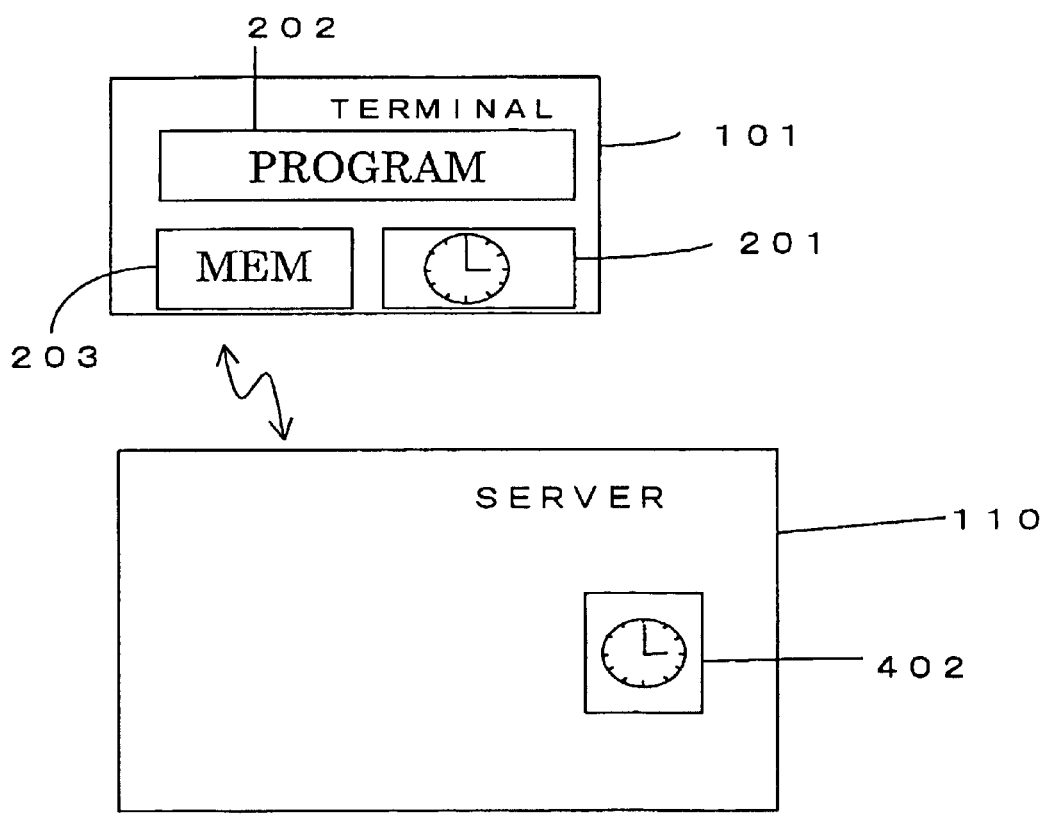
FIG. 2 illustrates an example of incorporating a timing module of the present invention.

As shown in FIG. 2, the user terminal participating in the present system is provided with a user clock module 201 having a time keeping function, and a server 110 having a server clock module 402. Also, the user terminal 101 installs a terminal communication program 202 for transmitting and receiving data or information between the user terminal 101 and the server 110. The terminal communication program 202 is one example of an update request transmission processing unit. The update request transmission processing unit has a function of transmitting a shared data update request, which will be described later.

The terminal communication program 202 can only be used by a specific user, so it should have a function to confirm the user using a password. In each user terminal, a memory 203 is installed.

The same user clock module 201 is used in all of the user terminals, including the wireless terminal 101. The user clock module 201 is removable from and attachable to all of the user terminals. The user clock module 201 becomes valid when authenticated by a system controller and when its time is adjusted to a standardized time adopted in the present system. Then the user clock module 201 is distributed to the specified users only. As an example, for a case of adopting the system in the commodities exchange market, the system controller should be performed by an inspecting organization in the market, and the system controller strictly controls the user clock module 201.

In the present system, a PC card is used to implement the user clock module 201.

Figure 3:
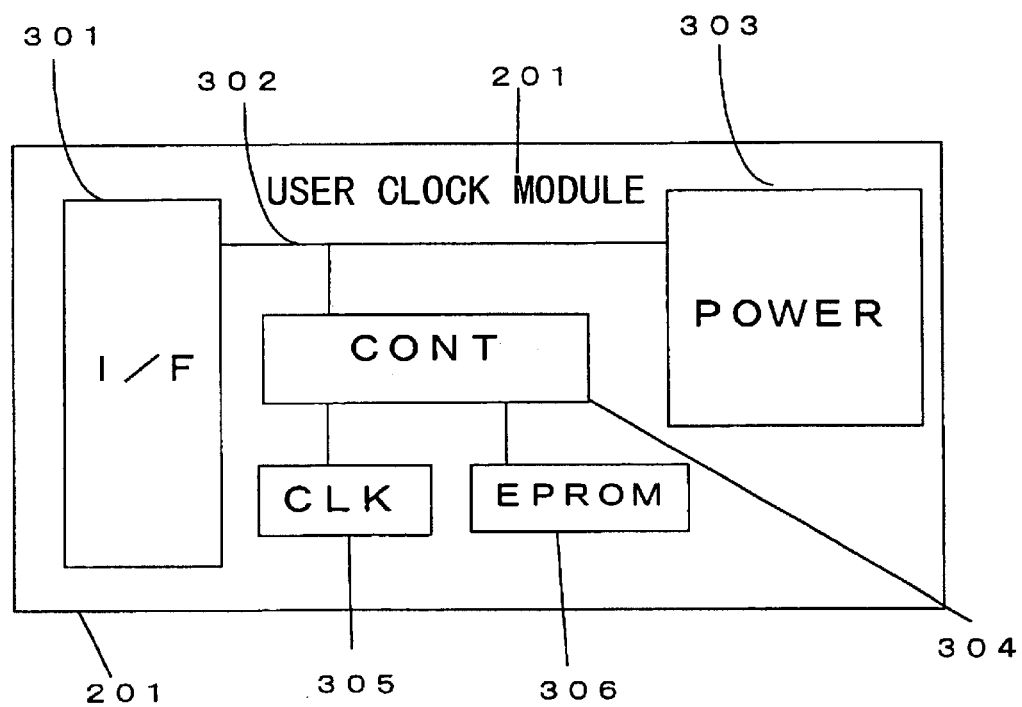
FIG. 3 illustrates a block chart of the timing module of the present invention.

FIG. 3 illustrates a functional block chart of the user clock module 201. Description of the numbered components indicated in the drawing of FIG. 3 follows: a PC card interface logic 301; an inner bus 302; a back-up battery 303; a control logic 304 for encryption; a clock 305; and an erasable programmable read only memory (EPROM) 306. The control logic 304 incorporates a time adjusting host authentication logic. The control logic 304 has an initial setting of adjusting the clock 305 to the standardized time of the present system, which will be described later, and an initial setting of user authentication data to the EPROM 306. The user clock module 201 becomes valid by these initial settings.

Such initial settings of the time adjustment and the user authentication data are performed by the system controller.

The terminal communication program 202 examines whether the use r clock module 201 is installed in the user terminal. If the user terminal is found to be installing the user clock module 201, then transmitting and receiving of data or information become possible, but only after a correct password is entered by-the user, the terminal communication program 202 can be used from the user.

Figure 4:
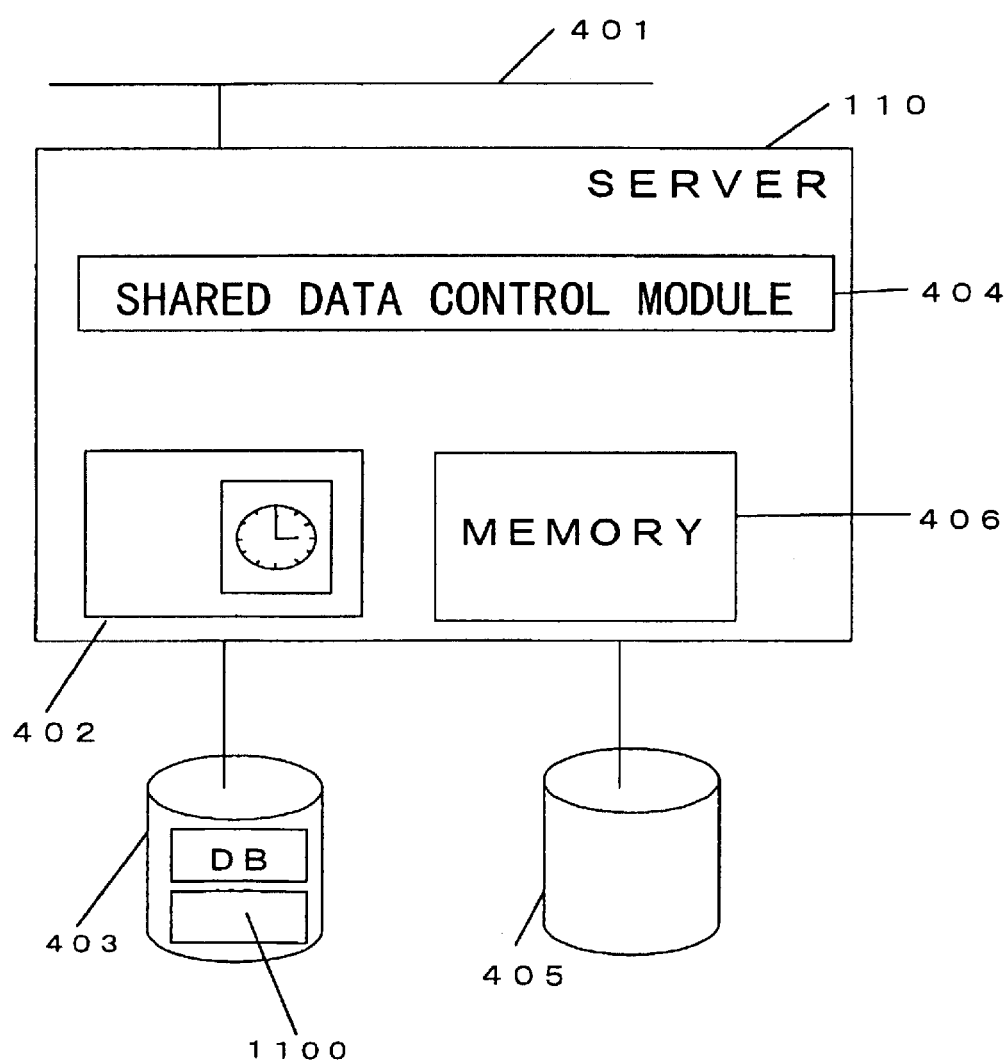
FIG. 4 illustrates a configuration of shared data control server of the present invention.

FIG. 4 illustrates a functional configuration of the server 110 which is a shared data controller of the present system. The shared data in the present system is a data record from each table of a database.

The server 110 is used by the plurality of users connected to a LAN 401. A server clock module 402 gives a standardized time of the present system, and has a clock which will become a standard for the user clock module 201.

The user clock module 201 adjusts its clock according to the clock of server clock module 402.

Description of the numbered components indicated in the drawing of FIG. 4 follows: an update request storing disk 403; a shared data control module 404; a shared data storing disk 405; a memory 406; and a user control table 1100, which will be described later.

Figure 5:
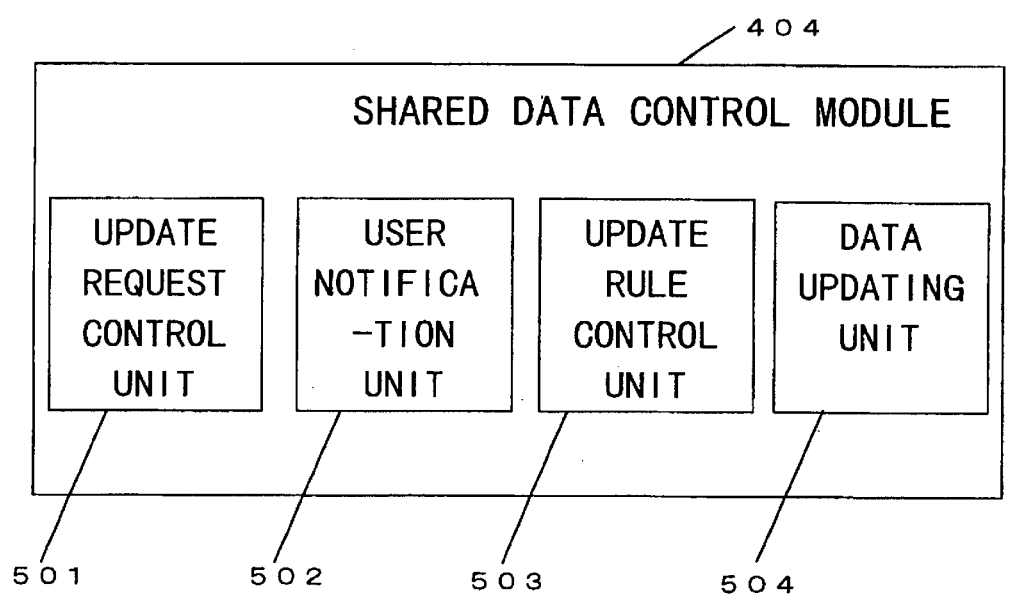
FIG. 5 illustrates a configuration of shared data control module of the present invention.

As shown in FIG. 5, a shared data control module 404 receives a request for updating the shared data from a user, and comprises the following parts: an update request control unit 501 for receiving and storing the request for updating the shared data from the user; a user notification unit 502 for performing a notification service of a data updating status to the users; an update rule control unit 503 for setting a period of receiving the request for updating the shared data and for performing an arbitration for the update of the shared data; and a data updating unit 504 for updating the shared data from an arranged (queued) update request data.

Followings are operations of the present system described based on functions 1 to 6.
1. functions of entering a request for updating data at the user terminal and transmitting-the entered request
2. update rule control function
3. shared data update request control function
4. data updating function
5. price estimation function
6. notification function to update content access user
1. functions of entering a request for updating data at the user terminal and transmitting the entered request First, a transmitting function of the update request of the shared data at the user terminal is described. A communication media to be used by the user is not mentioned, however, a mechanism including an issuance of the update request from the user terminal and a registration of the update request to the update request control unit is described. A communication re-trial mechanism is also described.

The user terminal has a PC card interface. When the user clock module 201 is incorporated in the system and when the terminal communication program 202 recognizes that a correct password has been entered by the user, then the terminal communication program 202 in the user terminal becomes ready to use.

As described previously, the example of adopting the present system to the commodities exchange system is described. FIG. 6(a) illustrates a screen of buying order prepared by the terminal communication program.

An order screen 601 sets the following conditions in a dialogue format: a product ID (identification); a buying quantity; and a buying price. FIG. 6 illustrates the product ID of oranges harvested in mid-February.

To the buying quantity, "just", "max" or "min" options are attached, indicating whether the buying quantity equals to, less than or greater than, respectively. An upper limit price is set as the buying price. In the example of FIG. 6(a), the buying quantity of about 200 is being indicated.

After setting the product ID, the buying quantity and the buying price, the user after checking the display screen presses a send button 602.

Alternatively, the options "max" and "min" can be used together as in expression indicated below. 100<buying price <200.

FIG. 6(b) is a screen for selling order. To this order screen 603, after inputting the product ID as in a case of the buying order, the user inputs a selling quantity. Unlike a case of the buying order, the options are not attached to the quantity for a case of selling, and the lower limit price is input as a selling price.

After setting the product ID, the selling quantity, and the selling price, the user after checking the screen presses a send button 604.

The buying price and the selling price is a first condition in the present invention.

When the user presses the send button 602 or 604, the terminal communication program 202 sends the buying order or the selling order, or in other words, sends the shared data update request to the server 110, based on the server address registered as a configuration data and based on the communication media being used.

Figure 7:
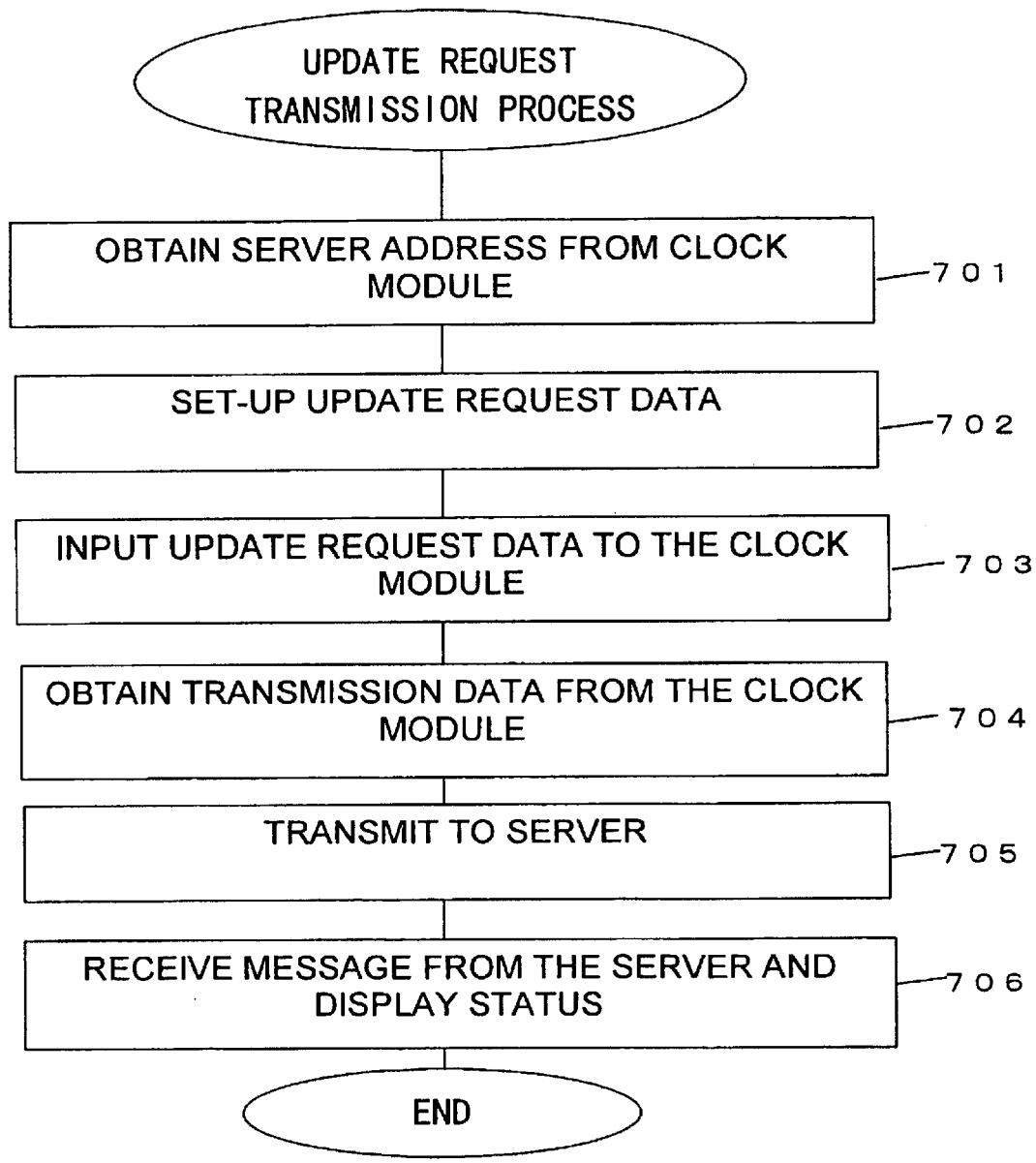
FIG. 7 illustrates a flow chart of shared data update issuing process of the present invention.
Figure 9:
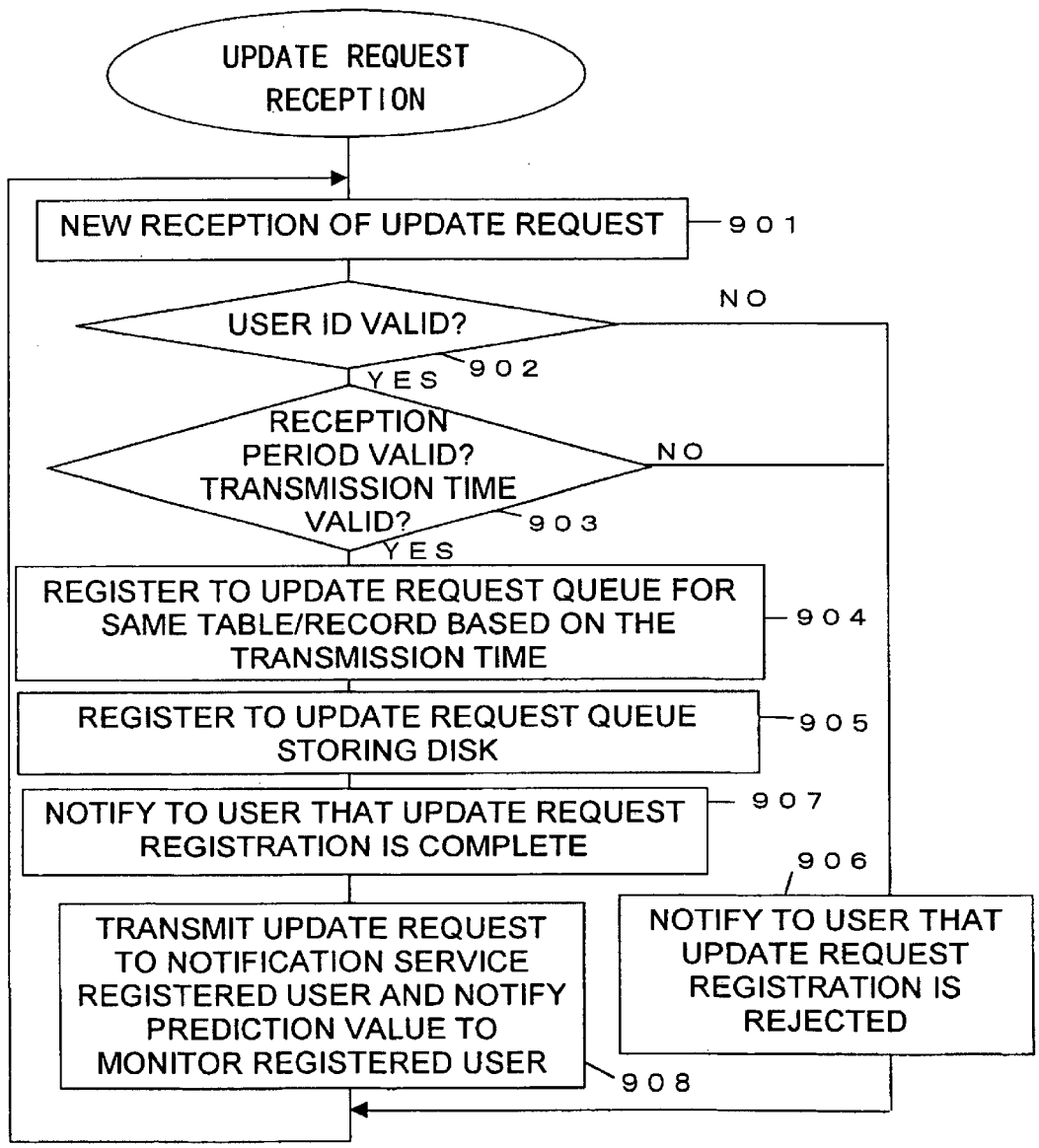
FIG. 9 illustrates a flow chart of shared data update request data of the present invention.

Sending procedures of the terminal communication program 202 to the server 110 after entering the buying order and the selling order from the user is described with reference to a flow chart of FIG. 7.

The terminal communication program 202 provides different screens for the buying order and the selling order to prevent an operation error. However, as the updating process, the procedures are identical for both cases, so the buying order only will be described below.

In the first process of step 701, a server address is obtained from the user clock module 201. In the present system, the server address is expressed using an IP (internet protocol) address.

In step 702, a data of the buying order provided from the user is organized into a format that can be accepted by the user clock module 201. In step 703, the formatted data of the buying order is inputted to the user clock module 201. From this input, the user clock module 201 creates an update request data 800 having a format shown in FIG. 8. Then, the user clock module 201 encrypts the update request data 800 using an encryption key which is provided at a time of the initial settings.

The update request data 800 includes the followings: a user ID 801 who specifies the user; a transmission time 802 which is a time when the update request data is issued, which is obtained from the clock module; a table ID 803 showing a product genre; a record ID 804 which is same in context as the product ID; an operation 805 for the quantity data (subtraction for buying and addition for selling); a quantity (operand) 806; a condition 807 for deciding operation execution; and an user's payment bank account 808 for carrying out a payment transaction accompanied with the shared data updating. If the operation 805 is subtraction, that is, the buying order, the condition 807 automatically represents an upper limit value of the buying price. If the operation 805 is addition, that is, the selling order, the condition 807 automatically represents a lower limit value of the selling price.

The update request data 800 of FIG. 8 illustrates the buying order including the transmission time of year 1997, month of September, 17th day, 11 hours 3 minutes 32.12 seconds, the table ID of fruit, the record ID of oranges harvested in mid February, quantity of about 200 and the buying price of less than 350.

The terminal communication program 202 receives an encrypted update request data 800 from the clock module 201 (step 704). The terminal communication program 202 sends the encrypted update request data 800 to the server in step 705.

As described previously, the transmission of the update request data 800 to the server will not always be successful, depending on the communication media being used by the user terminal at the time. The user terminal attempts a re-trial of the transmission to the server until the communication is successful. Even in the case of re-trial, the terminal communication program 202 will not alter the transmission time 802 in the update request data 800, and re-sends it containing the same transmission time 802 as the initial transmission time. By doing so, even if the user utilized a terminal that does not necessarily guarantee the connection status, it becomes possible to supply the data updating system and method that can execute the data update transaction equally among the users. For the present system, as the communication protocol, a transaction control protocol (TCP) is being used, therefore, whether the update request data is sent successfully or not to the server will definitely be known.

The encrypted update request data 800 is valid as long as it reaches the server during an update request reception period. Therefore, if the transmission fails, the user can use another communication media in sending the update request data 800 stored in the user terminal. Of course, the user terminal can also store the update request data 800 inside a memory 203.

When the update request data is received, the server 110 sends a receiving message to the user terminal. In step 706, the user terminal receives the receiving message from the server 110, recognizes whether the server 110 has received an update request or not (note that the update request may not be received by the server for a case outside the reception period), and notifies to the user.

2. Update Rule Control Function

The update rule control function, which is held by the update rule control unit 503, has the following functions: controlling an update request reception time of receiving the update request; controlling avalidation of issuance time of the update request; and controlling of the shared data update.

In the present embodiment, the adopted example is the commodities exchange. An update request reception period is set to 9 a.m. to 9 p.m., and a valid update request issuance period is set to 9 a.m. to 3 p.m. These periods are firmly set to a configuration data file which is accessed, referred and managed by the update rule control function.

The valid update request issuance period is expected to correspond to a general business hour of a marketplace, and only those buying and selling orders that are issued during these hours are valid.

The orders that are issued during the valid update request issuance period, depending on the communication condition, arrives to the server with some delay, therefore, taking into account a possible delaying time, the orders that arrived within the update request reception period are received by the server.

A data update processing is commenced after the completion of the reception at 9p.m.

3. Shared data update request control function

This function, held by the update request control unit 501, is a function to receive the shared data update request from a user. By receiving the update request from the user, the update request control unit 501 creates and controls an update request queue. A flow of the process is described using FIG. 9.

This process is operated using an independent context, and is always monitoring for an arrival of the update request from the user terminal. Strictly speaking, a new context is created by an arrival of connect request, and after obtaining one of global locks found in the updating request queue, the processes from step 901 onwards are performed, however, in this example, the flow is illustrated as a loop process. When the updating requests arrived in parallel, the process will be serialized, however, this has no effect on the equality of the transactions among the users.

When the encrypted update request data 800 is received at the step 901, this update request data 800 is decrypted to obtain the update request data illustrated in FIG. 8.

In step 902, the user ID of the update request data is checked, and if the user ID is unauthorized, then in step 906 the user is notified that the update request is not registered due to the unauthorized ID.

Following in step 903, an inquiry is made to the update rule control unit 503 to check whether a transmission time attached to the update request data 800 is within the valid update request issuance period or not, and checks whether its arrival time is within the update request reception period or not. If neither is found to be within these pre-determined periods, then the user is notified that the update request registration is rejected, accompanied by the reason, in step 906.

If in step 903, the transmission time and an arrival time of the update request data 800 is found to be within the pre-determined periods, then in step 904 two queue link pointers are attached to the update request data 800 for registering to the update request queue, and a user address is attached to the update request data 800 as the returning address to the user, and the update request data 800 is queued to the update request queue in an ascending order of the transmission time (in an order of earliest time).

Figure 14:
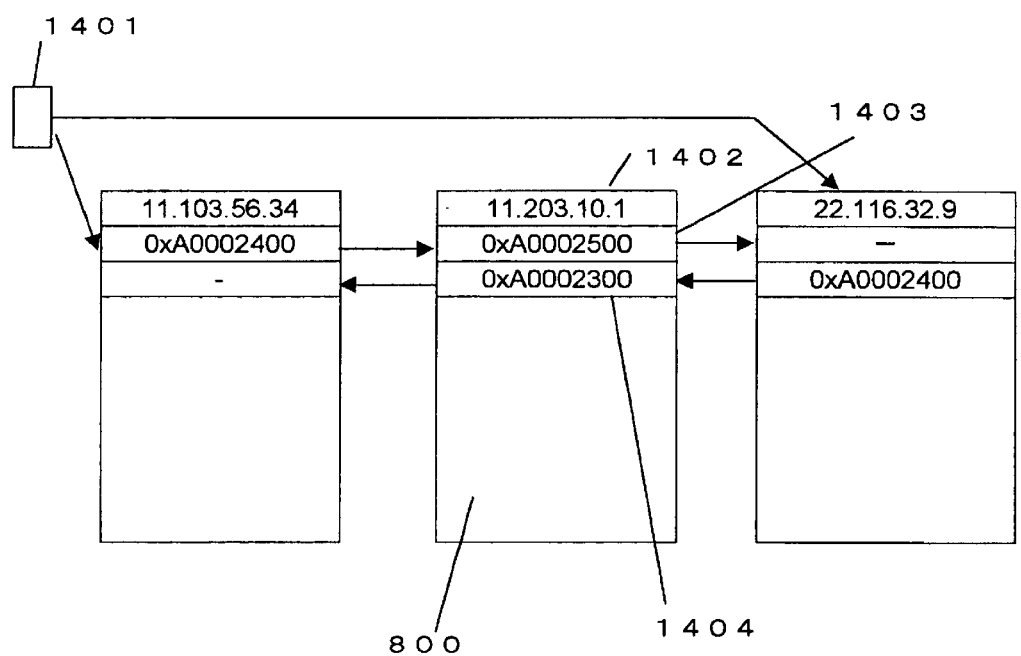
FIG. 14 illustrates an example of shared data update request queue of the present invention.

An example of configuration of the update request queue formed in a memory 406 is illustrated in FIG. 14 (hereinbelow simply referred to as a queue). A header 1401 for controlling the update request queue is illustrated in FIG. 14. The header queues three queue data. In addition to the update request data 800 shown in FIG. 8, the queue illustrated in FIG. 14 includes the followings: a queue link pointer 1403 indicating a previous queue data of the queue; a queue link pointer 1404 showing a next queue data; and a user address (port address).1402. Each queue data has a fixed length, and uses a sufficient size of a memory area for queuing. This region is called memory pool. With this memory pool, re-using of the memory area is possible by an operation of the queue link pointer.

Further, in step 905, a content of the memory pool is written to an update request storing disk 403 (one example of memory unit) corresponding to the memory pool of the update request queue. In step 907, the reception and the registration of the update request at the server 110 is notified to the user.

Further, in step 908, the update request data 800 is transferred to the users who are pre-registering a request for transferring the update request data 800. The registration for the transfer request of the update request 800 will be described in the following section "6. Notification function to update content access user".

When the system fails due to some trouble, the update request queue is restored to the memory 406 by reading the content of memory pool from the update request storing disk 403.

4. Data Updating Function

This function is possessed by the data updating unit 504. Following mechanisms are particularly described: functional operation by the update rule; de-queue of the update request data 800; and a checking mechanism of the update request.

In the present system, the data updating function is activated at 9 p.m. of the business day by the update rule control function. In the present embodiment, as a result, the data update is processed in batch, however this does not limit the present invention.

Figure 10:
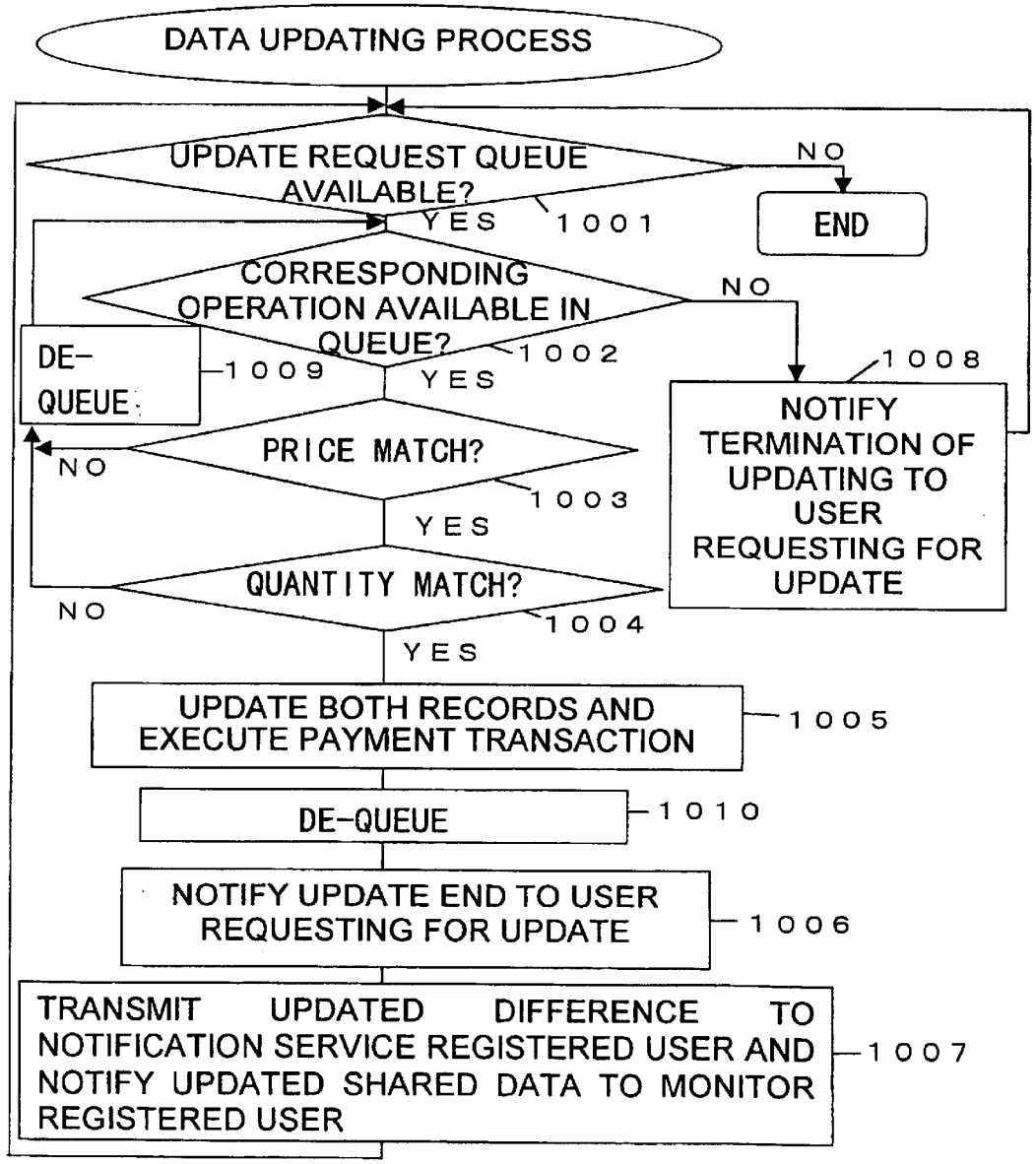
FIG. 10 illustrates a flow chart of the shared data update process of the present invention.

The present data updating process is described using a flow chart of FIG. 10.

Already, the update request queue is being arranged based on the update request issuance time of the user for every record, therefore, the updating process processes the queue data by accessing the update request queue in an order of the oldest issuing time for all records in step 1001, and de-queues (deletes) a processed queue data. The processing completes when all the queue data in the update request queue are processed.

In step 1002, the buying orders and selling orders from the update request queue are collated. If a queue data situated at a top of the update request queue, which has the oldest update request issuance time within unprocessed queue data, is a buying order, then queue data of the selling orders are searched in an ascending order, and checks for a selling price that matches the price in step 1003. If a matching selling price is found, that is, if the selling price≦buying price, then further in step 1004, the selling quantity and the buying quantity are compared. If the selling quantity satisfies the buying quantity, that is, if the selling quantity ≧buying quantity, then a deal is established and the price is registered in the database. Then in step 1010, the established queue data of the selling order and the queue data of the buying order are de-queued. At this time, when the selling quantity is greater to result in a remainder, that is, selling quantity>buying quantity (remainder quantity=selling quantity−buying quantity), the selling quantity is re-set to the remainder quantity. An established queue data of the buying order is de-queued (step 1010). If the price or the quantity does not match, the flow returns to step 1002 to search for a next candidate. However, if the quantity is not satisfied, the queue data of selling order is continuously read to search for the selling quantity and the selling price that satisfies the buyer, and if there is no selling order that matches the buyer's condition, this buying order is not established at all. The queue data of buying order not established is de-queued (step 1009). In the case of buying order described above, the buying order is a main order, and selling order is a dealing order of the a present invention.

If the queue data at the top of the update request queue is the selling order, a same processing is performed for the buying order. In the case of this selling order, the selling order is the main order, and the buying order is the dealing order of the present invention.

For the buying orders or selling orders that are not established, as well as those selling orders that has remainder after searching to the end, are drawn out from the update request queue as the remaining order at a time of de-queuing. As described above, regardless of whether the orders are established or not, and the top queue data is deleted (de-queued) from the update request queue. The deletion of queue data is performed by replacing the pointer of the header. Accordingly, the queue data moves in order to the top for processing.

If the buying and selling are established, that is, if the updating condition matches, in step 1005, the shared data is updated using the operation 805 (subtraction for buying, and addition for selling) and the operand 806 (product quantity in the present system) which are set at the update request data. In other words, a data of the record in the database in use is updated. Also, a payment accompanied by the buying and selling of the product is carried out using the user's payment bank account 808 set inside the update request data 800.

When the shared data updating is complete, a user who issued the update is notified that the buying and selling orders are established, and the shared data update is notified in step 1006, through the user notification unit 502.

The notification to the user is done at a nighttime, so the user terminal may not be operating, however, those notification that were not received by the user during this time will be re-transmitted again when the user terminal is operating.

Also, the user can inquire for a result of the update request that they transmitted by using the terminal communication program 202.

Further, in step 1007, a differential data of a record before updating and a record after updating is transmitted to a user who is pre-registering for a shared data update notification request. The registration of a request for shared data update notification is described in the following section "6. Notification function to update content access user".

If the orders do not match the conditions, that is, for the remaining orders, then in step 1008, the fact that the shared data update was not performed is notified to the user who issued the update request. This notification is sent to the port address registered in the update request queue.

5. Price Estimation Function

This function is possessed by the data updating unit 504, just like the data updating function. The data updating function makes a final decision of the buying and selling prices by collating the queue data of buying order and selling order when the update request reception period expires (in the present embodiment after 9 p.m.). The price estimation function collates the queue data storing the buying and selling orders which are received during the valid update request issuance period (9 a.m. to 3 a.m. in the present embodiment) in a pre-determined interval (every 10 minutes, for example), and takes the buying and selling prices established at that instance as a predicting value of the price. In this time interval, there is a possibility of the orders that are being already transmitted but not received, and they may include an order that has a different price from what is formally decided after starting the data updating function. For this reason, the predicting value is treated as a value to allow for an error.

When a plurality of the buying and selling orders are established within the pre-determined interval, its maximum value and minimum value are taken as the predicting values. Alternatively, an average value may be taken as the predicting value.

6. Notification Function to Update Content Access User

This function is possessed by the user notification unit 502.

In the present system, when the user is registered to the server 110 using the user clock module 201, the user ID is registered as a control data of the server 110, however, in doing so, a permission of the user is also registered to the server 110. The permission reflects an actual dealing result in the product dealing market, and depending on a given permission, the user can use a data referring service which will be described later on. The permission is given in three types from permission 1 to permission 3. Each permission is described below.

1. Permission 1: a user can receive a notification when the shared data updating is completed. Specifically, in the present system, the user can successively refer to data of approved product dealings after 9 p.m. from the notification. The permission 1 is a permission which enables to receive the shared data update notification previously described in "4. Data updating function".

2. Permission 2: a user can receive a content of the shared data update request handled by the server before updating the shared data. The permission 2 can successively receive the content of update request data which is arrived from the commencing time of the market 9 a.m. until the update request reception period expires, and this enables the user to obtain the most recent market trend. Also, based on pre-approved update request data, the predicting value of the market trend is obtained. The permission 2 is a permission which can transfer the update request data which is previously described in "3. Shared data update request control function".

3. Permission 3: a user can obtain an update log of the shared data of a past. The permission 3 enables the user to obtain the update log of the shared data throughout the past. The permission 2 includes the permission 1, and the permission includes the permission 1 and permission 2. The permission of the user is registered as 1, 2 or 3. When an user requests for a registration to the data referring service, the user is registered to the data referring service by checking the permission.

Prior to describing the data referring service, the user registration to the data referring service is described first.

Figure 11:
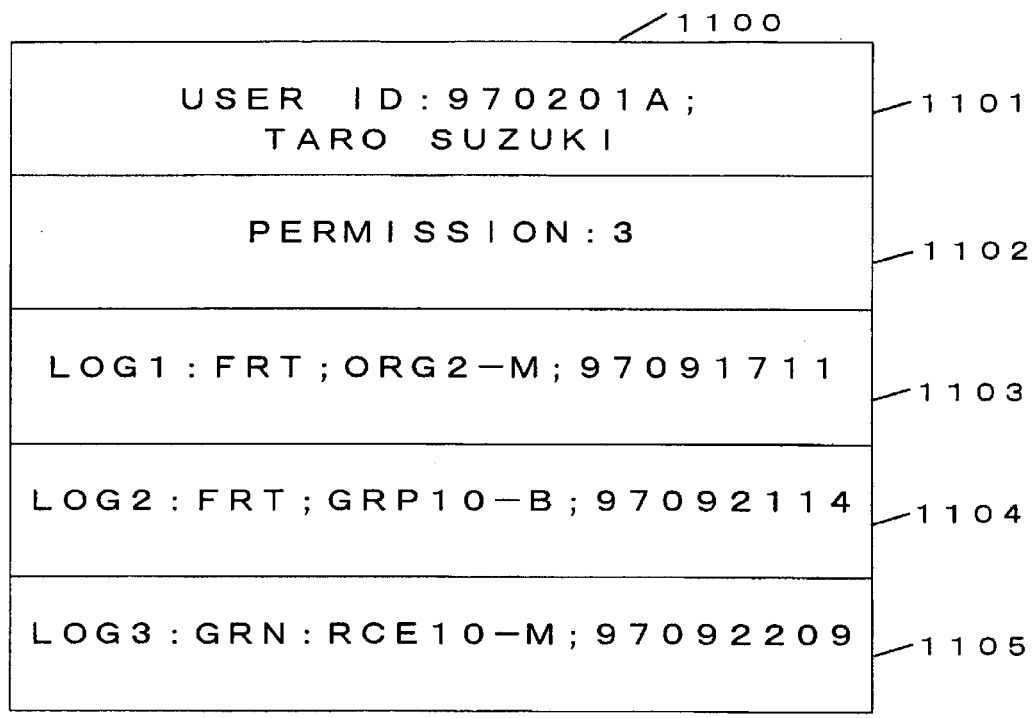
FIG. 11 illustrates an example of user ID data of the present invention.

FIG. 11 illustrates a user control table 1100 of the system which controls a registered content. The user control table 1100 is stored in the update request storing disk 403. The user ID is stored in the user control table 1100. The previously described permission is registered in 1102. Log of the shared data update request issued by the user is registered from 1103 onwards.

With regard to updating a database in the system of the present invention, a shared data access is performed by requesting to the server 110. However, with regard to reading a database, it is performed by the user directly accessing to the database. Accordingly, the present embodiment only focuses on an issuance of the shared data update request as an access log, however this does not limit the present invention.

Figure 12:
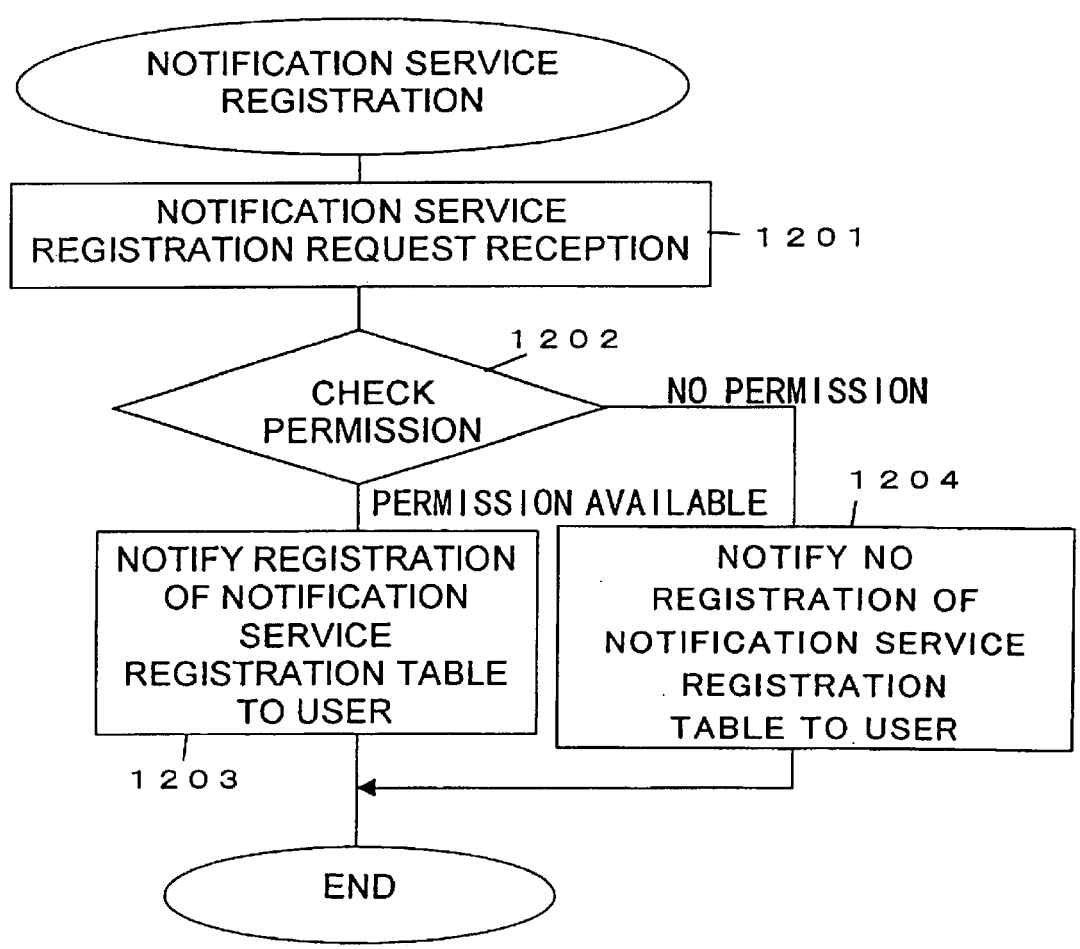
FIG. 12 illustrates a flow chart of notification service registration process of the present invention.

FIG. 12 illustrates a flow of the user registration process of the update content notification service.

The user registration process flow illustrated in FIG. 12 is used by the shared data update notification service corresponding to the permission 1, and used by a successive reporting service of the update request data corresponding to the permission 2.

Figure 15:
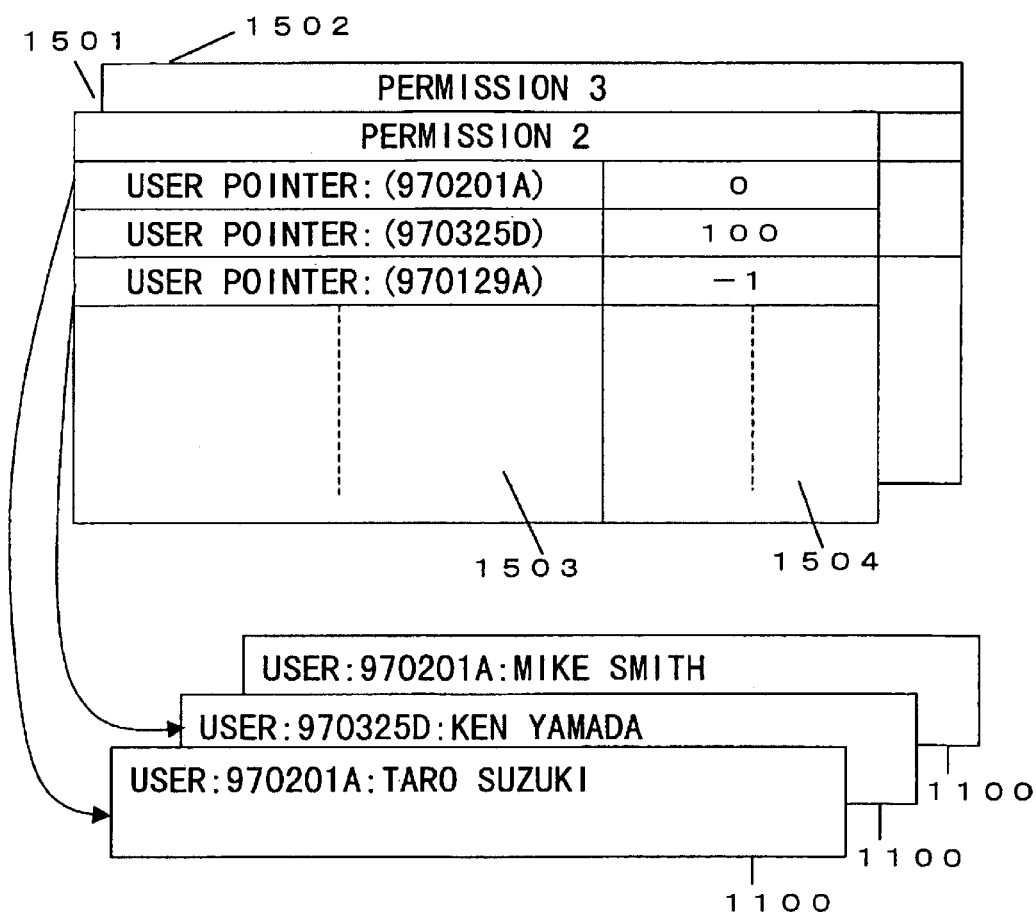
FIG. 15 illustrates a schematic diagram of notification service registration service of the present invention.

In step 1201, a request for the registration to the notification service is received from the user. In step 1202, the permission held by the user is checked, and if the user had a permission to receive the notification service, an entry 1503 and an entry 1504 are added to the notification service registration tables 1501 and 1502 according to permissions as indicated in FIG. 15. The entry 1503 is an user pointer to the user control table 1100. The entry 1504 is a notification control information by a data access log. Both of the entries are stored in the notification service registration tables 1501 and 1502. If a permission held by the user is not suitable for the notification service, then step 1204 reports that the user is not registered to the notification service registration table.

It has already been described that the data updating unit 504 notifies the shared data updating for the users who are pre-registered for the shared data update notification request (user having permission 1). Next, how the updating process of the differential data for transmission of step 1007 operates under the control of the data access log is described.

In the entry 1504 of the notification service registration tables 1501 and 1502, if the permission is unlimited, 0 is registered. If the permission is limited to a record that has actually accessed before, −1 is registered. If the permission is limited to a valid period of time from the last access, the period is registered in an hourly unit. When 0 is being registered as the entry, the differential data is transmitted unconditionally (depending on a requirement of the user, it is possible to make selection so that the updated data only is notified). When −1 is being registered as the entry, the user control table 1100 is accessed from the user pointer of the user control table 1100, and the shared data update log 1103 to 1105 are referred to see whether the user has accessed the record in the past, and if found to be so, the differential data is transmitted. When a valid reference period is being registered in the entry, a last access time (update request issuance period) of the record is referred based on its log information, and if there is an access log for the record, and if the last access time is within the valid reference period, the differential data is transmitted.

When the server 110 receives the update request, it has already been described that the update request data 800 is transferred to the user who is registered for transferring the update request data 800 of the shared data (user having permission 2). The notification control in 908 is also processed as in the process described in step 1006.

In the present system, if the user has permission 3, the user can request for a notification of the update log of shared data and a notification of the update request data 800 before updating the shared data. The present system is provided with a port for inquiring the update log of shared data and a port for inquiring the update request data. In the present system, the update log of shared data is implemented by a log function of the database. When a user requests for a data to the port for inquiring the update log of shared data in the server by specifying a table, a record, and a period, then the server checks the permission held by the user, inquires to the database, and returns the update log within a requested period to the user.

The user can request the update request data 800 before updating the shared data by specifying the table only, specifying the record only, or specifying the record that has actually accessed before only, alternatively, specifying the record in a valid period of time from a last access only, or combining these conditions.

When the server 110 receives the request above to its port for inquiring the update request data, upon recognizing the user permission, the server creates a list that matches in condition in an order of the oldest update request data received, which is kept and controlled in a queue, and returns the list to the user. When the sever 110 receives the update request data 800, it obtains an exclusive-control lock of the update request queue and inserts the update request data 800 to the update request queue. However, a searching is performed by appropriately releasing the exclusive-control lock of the update request queue.

Figure 13:
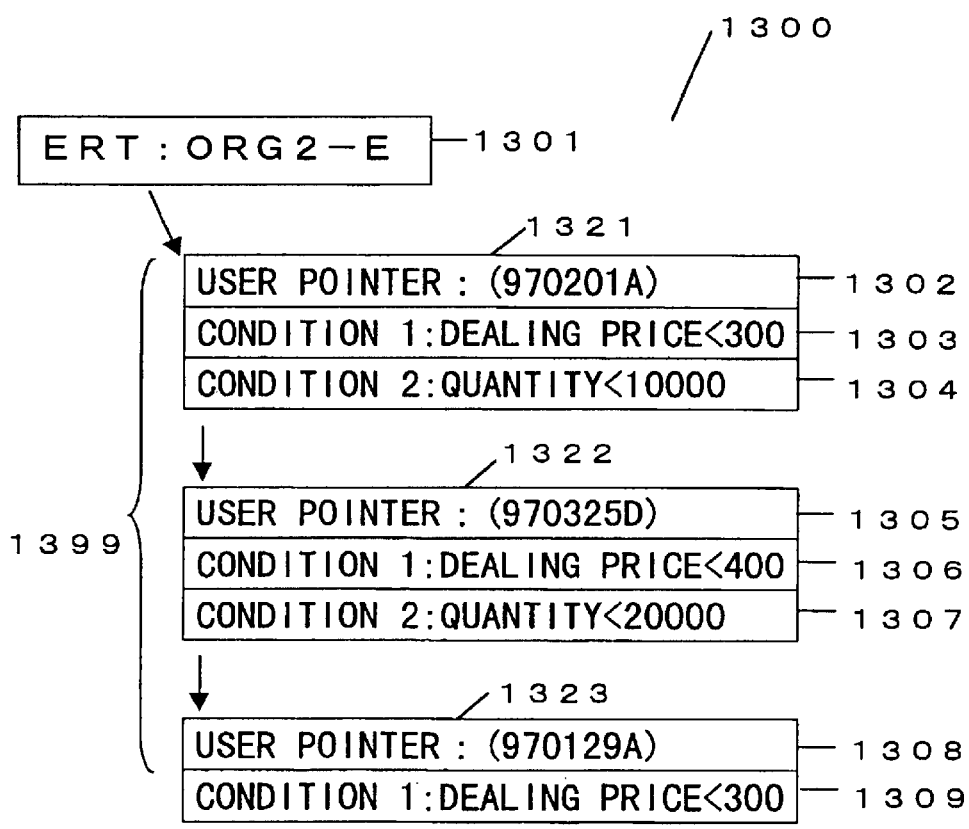
FIG. 13 illustrates a schematic diagram of data monitoring registration queue of the present invention.

Now, the present system is provided with a monitoring function of the shared data and a monitoring function of the predicting value. The monitoring function monitors the shared data itself and monitors the predicting value which is calculated from the update request and which is calculated by the server 110. That is, based on a product name, a of remaining quantity and a dealing price are monitored. The present system is provided with a monitor registration port for receiving a monitor request of the shared data and a monitor registration port for receiving a monitor request of the predicting value. When the user selects either one of the monitor registration ports by specifying the table, the record, and the monitor condition, then the selected monitor request is transmitted to the server. Upon checking the permission held by the user, the server carries out a registration of the monitor request to a monitor queue 1300 illustrated in FIG. 13. (Note that a monitor of the shared data is usable by all the users, however, a monitor of the predicting value requires permission 2 or a higher permission) The monitor queue 1300 is provided for each record. Each record is made as a hash entry wherein a record name is used as a hash key. A header 1301 is the hash key, connected to a hash link 1399 comprised of monitor service registration tables 1321 to 1323. In FIG. 13, only one queue is being illustrated, however, when registering the monitor request to the monitor queue, there is two queues including the monitor request of shared data and the monitor request of predicting value.

In step 1007 of the shared data update process illustrated in FIG. 10, after a data update notification process 1006 is performed to the user, monitor conditions of the shared data in each record of the monitor service registration tables 1321 to 1323 are searched, and when the conditions are met by an updated change, the change is notified to the user.

In the example of FIG. 13, an user of the monitor service registration table 1321 who is the first one in the monitor queue sets two conditions including a dealing value 1303 and a quantity 1304. However, notification will be performed when one of these conditions is matched.

The present embodiment describes the buying order and the selling order in the commodities exchange, however, the present invention is not only limited to such orders of the commodities, and can also be applied, for example, to the inventory control in supermarkets. In such a case, the inventory supply request should correspond to the buying order, and the inventory supply should correspond to the selling order. As long as the selling order and the buying order of the present invention correspond to a demand and a supply respectively, an alternative embodiment can be adopted.

Also, in the present embodiment, a period of time between 9 a.m. to 3 p.m. is set as the valid update request issuance period and a period of time between 9 a.m. to 9 p.m. is set as the update request reception period. Other time periods can be applied, in minutes or in days units.

Further, the present embodiment is also operational when the update request reception period and the valid update request issuance period are equal.

Furthermore, each module and each unit can be implemented using the software or hardware, or can be a combination of the software and the hardware.

Industrial Applicability

As described above, the data updating system and the data updating method of the present invention updates the shared data based on the data update request issuing time, therefore, the data updating that does not rely on a communication connection status among the users and the server is possible to implement a fair data updating.

Also, by setting the update request reception period or by setting the valid update request issuance period, a system can operate flexibly.

Further, the user can flexibly use the system by setting the conditions for data updating.

Furthermore, since the shared data update predicting value is decided based on the shared data update request, the user can efficiently evaluate their own shared data update request.

Furthermore, since an information to be transmitted to each user terminal is selected by the permission held by the user, so that the server can efficiently transmit the information.

Furthermore, the server transmits the content of data update request entered from each user terminal or transmits the data update log only to the user terminal having the permission of greater than a certain strength, such that the server can transmit information efficiently responding to a system load or a user's needs.

Further, the server notifies the user terminal when updating the shared data, so the user can efficiently make a decision.

Furthermore, since a difference of the shared data before and after updating is included in the content of notification, the user can readily reproduce the shared data.

Furthermore, a user terminal where the server notifies to is the user terminal that has made access to the shared data before updating the shared data, therefore, an operation responding to the system load and the user's needs is possible.

Furthermore, a user terminal where the server notifies to is the user terminal that has made access to the shared data in a valid period of time before updating the shared data, therefore, an operation responding to the system load and the user's needs is possible.

Furthermore, if an information transmission request is made from the user terminal, the server checks the access log to the shared data of the user terminal, and only to those user terminal that has made access to the shared data before, the server responds to the information transmission request, therefore, an operation responding to the system loads and the user's needs is possible.

Furthermore, the server responds only when the user terminal has made access to the shared data within a valid period of time before the request, therefore, an operation responding to the system load and the user's needs is possible.

Furthermore, the information transmission request is a transmission request for the content of a previous data update request already arrived in the server before updating process of the shared data, therefore, an operation responding to the system load and the user's needs is possible.

Furthermore, a user terminal registers a condition for updating the shared data, and a shared data controller notifies the user terminal when the condition set in the server for data updating is met, therefore, the user can inspect the updating of shared data.

Furthermore, a user terminal registers a condition to a server for updating the shared data, and the server notifies to the user terminal when the condition set by the user terminal is met. The condition is the shared data updating predicting value of the data updating request from the user terminal or from another user terminal.

Furthermore, the clock function perform an encryption that the system controller only can decrypt, therefore, this is effective by means of preventing an unauthorized decryption when performing a sequential data updating.

Furthermore, the clock function has a user authentication function, therefore, an unauthorized access is prevented by specifying the user.

Furthermore, since the server stores to a memory a shared data update request from the user terminal, therefore, when a trouble occurs in a management system, a received update data is correctly reflected to the shared data after restoring the received update data to the management system.

Furthermore, the shared data updating request comprises the selling order or buying order including the first condition and the quantity. The shared data updating request is stored in the shared data update request queue in an order of the data update request issuing time. For the buying order, the selling order that meets the first condition of the buying order is searched in an order. When the first condition matches, a next condition which is quantity is searched on contrary, for the selling order, if the first condition of the buying order is searched in an order, and when the first condition matches, the next condition which is quantity is searched. Therefore, the buying order and the selling order with matching conditions are effectively searched.

What is claimed is:

1. A data updating system, comprising:
   a plurality of user terminals; and
   a server for controlling a shared data among users;
   wherein the plurality of user terminals and the server include clock modules for keeping a time synchronized between the user terminal and the server;
   wherein the user terminal includes an update request transmission processing unit for transmitting a shared data update request to the server by attaching a time obtained from the clock module as a data update issuing time when representing a shared data updating, and for repeatedly transmitting the shared data update request in keeping the data update issuing time unchanged until the shared data update request is received by the server; and
   wherein the server includes a shared data control module for deciding an updating order of the shared data update request based on an attached data update issuing time of the shared data update request received from the user terminal.

2. The data updating system according to claim 1, wherein the shared data control module includes an update rule control unit for setting an update request reception period, and an update request control unit for receiving the shared data update request received within the update request reception period.

3. The data updating system according to claim 2, wherein the update rule control unit further sets a valid update request issuance period which is included in the update request reception period;
   wherein the update request control unit receives a shared data update request for which a data update request issuance period of the shared data update request received is within the valid update request issuance period.

4. The data updating system according to claim 3, wherein the update data request transmission processing unit transmits the shared data update request including a data updating condition to the server;
   wherein the shared data control module includes a data updating unit for checking the data updating condition included in the shared data update request in an order of data update request issuance time after the update request reception period expires, deciding a shared data update value based on the shared data update request when the update condition is met, and updating the shared data to the shared data updating value.

5. The data updating system according to claim 4, wherein the data updating unit checks the data updating condition included in the shared data update request which is already received within the valid update request issuance period in an order of the update request issuing time, and decides a shared data update predicting value based on the shared data update request when the update condition is met.

6. The data updating system according to claim 1, wherein the shared data control module includes a user notification unit for giving one of permissions to the user terminal from permissions classified by strengths, and selecting information which is transmitted to the user terminal based on the permission.

7. The data updating system according to claim 6, wherein the user notification unit transmits an update log of the shared data only to a user terminal having a permission of a certain strength.

8. The data updating system according to claim 6, wherein the user notification unit transmits a content of the data updating request received from the user terminals only to a user terminal having a permission of a certain strength.

9. The data updating system according to claim 1, wherein the shared data control module includes a user notification unit for notifying the shared data to the user terminal when the shared data is updated.

10. The data updating system according to claim 9, wherein the user notification unit includes at least a differential data between the shared data before updating and after updating in a content of the notification.

11. The data updating system according to claim 9, wherein the user notification unit notifies to a user terminal that has accessed the shared data before updating the shared data.

12. The data updating system according to claim 9, wherein the user notification unit notifies to a user terminal that has accessed the shared data within a pre-determined period before updating the shared data.

13. The data updating system according to claim 1, wherein the user terminal transmit s an information transmission request to the server, and wherein the shared data control module includes a user notification unit for receiving the information transmission request from the user terminal, checking an access log, and responding to the information transmission request if the user terminal has accessed the shared data before receiving the information transmission request.

14. The data updating system according to claim 13, wherein the user notification unit responds to the information transmission request if the user terminal has accessed the shared data within the pre-determined period before receiving the information transmission request.

15. The data updating system according to claim 13, wherein the information transmission request from the user terminal is a transmission request of the content of the data updating request already arrived to the server before a shared data updating process.

16. The data updating system according to claim 1, wherein the user terminal transmits a condition for monitoring the shared data updating;
wherein the shared data control module includes a user notification unit for registering a transmitted condition, and notifying the shared data updating to the user terminal when the condition is met at the shared data updating.

17. The data updating system according to claim 5, wherein the user terminal transmits a condition for monitoring the shared data updating;
wherein the shared data control module includes a user notification unit for registering the transmitted condition, and notifying to the user terminal that the shared data updating predicting value meets the condition when the shared data updating predicting value meets the condition.

18. The data updating system according to claim 1, wherein the clock module includes an encryption unit.

19. The data updating system according to claim 1, wherein the clock module includes a user terminal authentication function.

20. The data updating system according to claim 1, wherein the server includes a memory unit for storing a shared data updating request queue, and arranging the shared data update request received from the user terminal by the shared data control module in an order of the data update request issuance time.

21. A data updating method for a computer systems having a plurality of user terminals, and a server for controlling the shared data among the users, wherein the plurality of user terminals and the server respectively have clock modules for keeping a time, the data updating method comprising the steps of:
synchronizing a time between the clock modules of a plurality of user terminals and the clock module of the server;
by the user terminal, attaching a time obtained from the clock module as a data update request issuance time to a shared data update request when requesting a shared data update, and transmitting the shared data update request to the server, and repeatedly transmitting the shared data update request in keeping the data update request issuance time unchanged until the shared data update request is received at the server; and
by the server, receiving the shared data update request from the user terminal and deciding the updating order of the shared data based on an attached data update request issuance time attached to the shared data update request received.

22. The data updating method according to claim 21, wherein the shared data update request is one of a selling order and a buying order which includes a first condition and a quantity, wherein the shared data update request is stored in a memory unit of the server in a format of shared data update request queue in an order of the data update request issuance time,
wherein the data updating method comprises the steps of:
a) checking by executing one of the steps of (a1) to (a3), depending on a state of the shared data updating request queue stored in the memory unit of the server;
a1) completing the data updating process when neither the selling order nor the buying order is stored in the shared data update request queue stored in the memory unit of the server;
a2) taking the buying order as a main order and taking the selling order as a dealing order when a top of the shared data update request queue stored in the memory unit of the server is the buying order, and advancing to a first condition comparing step (b); and
a3) taking the selling order as a main order and the buying order as a dealing order when a top of the shared data updating request queue stored in the memory unit of the server is the selling order, and advancing to the first condition comparing step (b); and
b) comparing the first condition by reading the dealing order in an order from the shared data updating request queue stored in the memory unit of the server, and executing one of the steps depending on an availability of a dealing order that matches in the first condition with the main order;
b1), if there is no matching in first condition, deleting the main order from the shared data update request queue as a non-established main order and returning to the checking step (a);
b2) if the first condition matches, comparing the buying quantity and the selling quantity, and executing one of the following steps based on a result of comparing;
b21) if the buying quantity is exceeding the selling quantity, non-establishing the buying order and the selling order, and reading a next dealing order from the shared data update request queue, and returning to the first condition comparing step;

b22) if the buying quantity is same with the selling quantity, establishing the buying order and the selling order, deleting the buying order and the selling order from the shared data update request queue, and returning to the checking step (a); and b23) if the selling quantity exceeds the buying quantity, establishing the selling order and the buying order, deleting the buying order from the shared data update request queue, and replacing selling quantity to an exceeding buying quantity, updating and storing the queue data of the selling order, and returning to the checking step (a).

* * * * *